Figure 1:
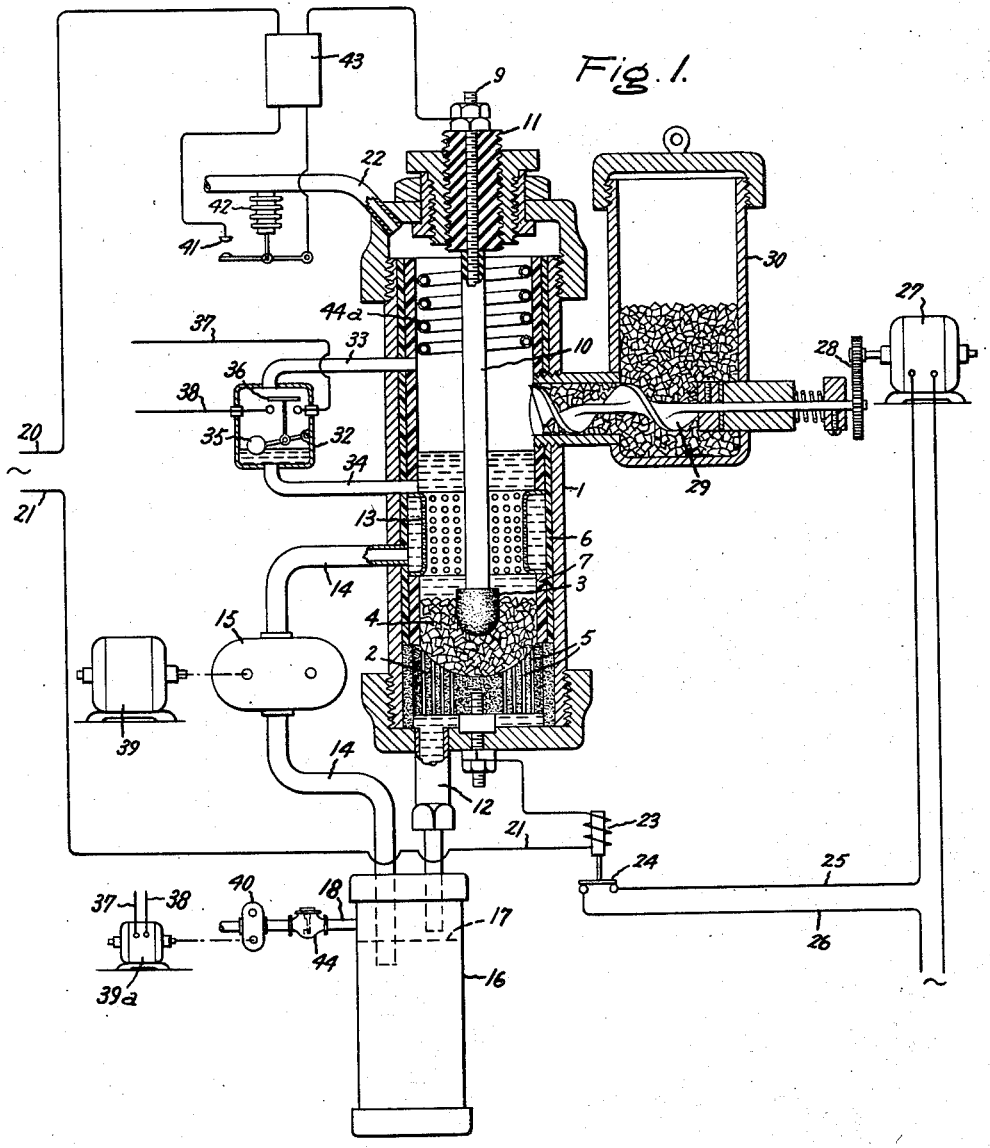

2,785,119
TRANSIENT ARC METHOD OF PREPARING FLUOROCARBONS

Newell C. Cook, Schenectady, and John K. Wolfe, Burnt Hills, N. Y., assignors to General Electric Company, a corporation of New York Application July 18, 1955, Serial No. 522,774

4 Claims. (Cl. 204—169)

This invention relates to the production of fluorocarbons. More particularly, this invention relates to the production of fluorocarbons by subjecting liquid hydrogen fluoride (HF) to transient electric arcs in the presence of discrete carbon particles. The term "fluorocarbon" as herein used is defined as a hydrocarbon wherein all or some of the hydrogens contained therein have been replaced by fluorine.

Since fluorocarbons are more stable thermodynamically and more resistant to chemical attack than most analogous organic compounds, they have been put to a large variety of industrial uses. Because as a class the lower fluorocarbons are stable chemically and electrically, are non-inflammable and are comparatively non-corrosive with respect to metals, etc. they are particularly useful as refrigerants, as gaseous insulation in electrical equipment, as aerosol propellants, etc. Thus, an inexpensive process for converting hydrogen fluoride to these useful compounds would be of great economic importance.

We have now discovered that when an electric arc supporting current is conducted through a bed or column of contacting discrete particles of carbon immersed in HF, transient electric arcs of momentary duration are formed between the particles in the liquid HF. These electric arcs result in the formation and evolution of gases which comprise fluorocarbons. The significance of this process is that fluorocarbons can be prepared by an arc process in an economic fashion wherein the overall temperature of the reaction mixture is kept comparatively low.

Reference to the attached drawings will lead to a fuller understanding of the nature of the invention and some of the considerations employed in the practice of the present invention. In the drawings:

Figure 1 comprises an embodiment of a transient arc reaction chamber.

Figure 2:
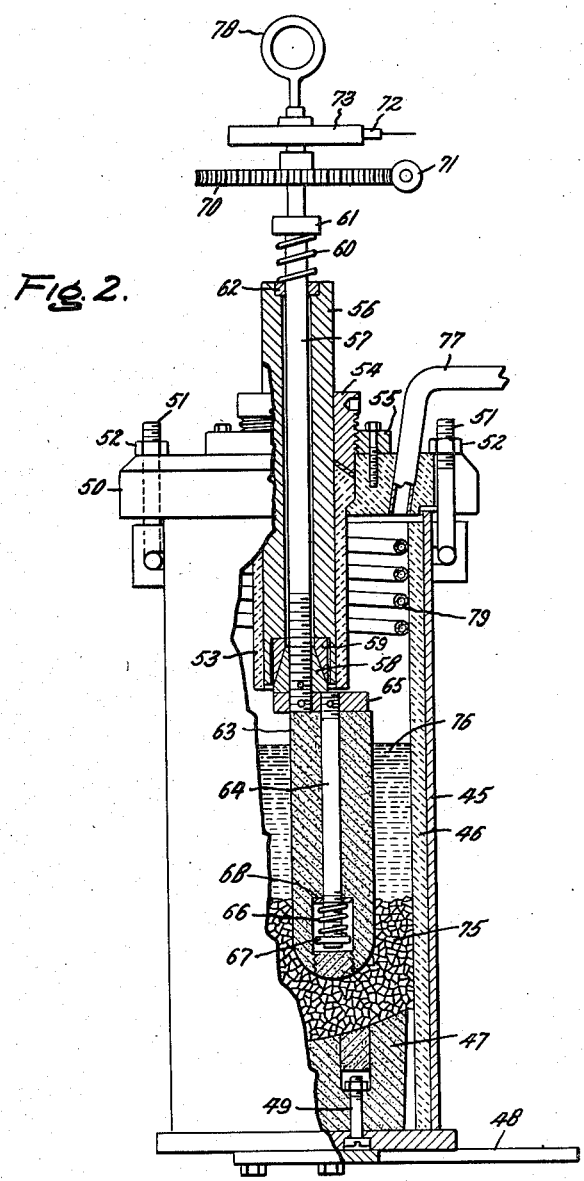

Figure 2 comprises an embodiment of a transient arc reaction chamber wherein one of the electrodes is rotated transversely with respect to its cooperating electrode and thereby is rendered capable of agitating the particles of carbon.

The apparatus illustrated by Figures 1 and 2 include in addition to the essential features of an apparatus for carrying out our invention various automatic auxiliary devices and various non-essential structural details.

The fluorocarbon apparatus comprises an arc chamber 1, which is provided with cooperating electrodes 2 and 3 which are spaced apart and respectively make electrical contact with a bed of discrete carbon particles 4, the particles being arranged movably in contacting relation. During operation transient arcs are formed at points of contact between adjacent particles. The material 4 preferably consists of loose lumps or particles of carbon such, for example, as coke, coal, amorphous carbon or graphite. These particles may have a diameter ranging from a very small size up to one inch or more, the preferred size being less than about one-quarter inch.

Liquid HF fills the spaces between the discrete carbon particles forming the bed between the electrodes. The liquid conveniently is introduced through ducts 5 extending through the lower electrode 2 as indicated. The distance between the electrodes 2, 3 is not critical. This spacing ordinarily should be at least about one inch, and may be up to many inches in length.

Although the structure of the conversion chamber and electrodes may be varied, it may be said for illustrative purposes that the container 1 may consist of suitable metal, such as iron, and may be provided with a lining which in the apparatus illustrated consists of two layers, a layer 6 of non-conducting material such as heat-hardened phenolic resin or the like, and a layer 7 of a material unaffected by HF such as polyethylene, fluoroethylene, or chlorofluoroethylene etc. adjacent to the arcing zone. The electrodes 2, 3 may consist of graphite or a conducting metal such as copper, etc. The electrode 3 is attached to a stem 9 consisting of copper or other suitable conductive material which is surrounded by a sheath 10 of polyethylene or other suitable insulating material. The electrode stem 9 is insulated from the container by a bushing 11 of suitable insulating material, as, for example, a phenolic resin composition.

Liquid HF is introduced by a conduit 12 which communicates with the ducts 5 and leaves the reaction chamber through a strainer 13. The liquid HF then is conveyed through a conduit 14 by a pump 15 into a settling tank 16 from whence it is returned by the conduit 12 to the reaction chamber. In the tank 16, fine particles, such as carbon black, which may be formed in the liquid are largely removed by the strainer 17. Additional amounts of HF may be introduced through a conduit 18 containing a one-way valve 44, as will be later described.

Assuming the space between the electrodes to contain carbon granules and the space between the granules to be filled with HF in which the particles move freely due to their buoyancy, a current of about an ampere or more at suitable potential of at least 30 volts is supplied to the electrodes by the conductors 20, 21. Preferably the voltage should be materially higher. For example, alternating current at 60 cycles and at a potential in the range from several hundred to one thousand volts may be employed for an electrode separation of one inch.

Vigorous arcing occurs due to gas generation at the points of contact of adjacent granules and the consequent separation thereof, each arc being accompanied by the generation of gas and in turn being extinguished by the gas evolution. No ballast or series steadying resistance in the arc circuit is required. The duration of the transient arcs ranges from about .00006 second to .01 second, the arcs of relatively long duration in this range being more common.

Under the conditions above described, that is, when particles or lumps of carbonaceous material, such as coke are introduced in loose contact between graphite electrodes spaced apart about one inch, and when a body of HF envelops such particles or lumps, then with an applied voltage of, for example, about 30–500 volts or more and a mean current of, for example, about 1 to 100 or more amperes the results obtained by the practice of my invention in general are as follows:

Vigorous evolution of gas results from the transient arc discharges, which being of short duration no general heating of the carbon particles occurs. Since the carbon particles are surrounded by a continuous liquid HF bath, the temperature of the coke may not, and ordinarily does not, appreciably exceed that of the liquid. The reaction chamber, which, as illustrated, is large relative to the mass of liquid acted upon, also functions as a heat-dissipating means. In addition cooling means may be used to keep HF below its boiling point (19° C). A convenient manner of keeping the general temperature of the reaction mixture constant is to allow the HF to reflux, vaporous HF returning to the reaction mixture upon contact with cooling coils 44a.

The gases generated in the arc pass through the HF and are drawn off by a conduit 22. The gas comprises a mixture of fluorocarbons, for example, completely and partially fluorinated members of the alkane series.

During the operation of the arcs, consumption of carbon occurs and as the level of the carbon granules falls, decreased conductivity results between the electrodes 2 and 3. In an automatic apparatus, the reduction of the current in the conductor 21 weakens its effect on the solenoid of the relay 23 until its armature 24 bridges the contacts in the circuit 25, 26 of the motor 27. The motor is connected by the gears 28 to a feed screw 29 located in a supply chamber 30. Due to the operation of the feed screw 29, additional granules of carbon are charged from time to time into the reaction chamber 1 to make up for losses.

If the level of the liquid in the reaction chamber is reduced below a predetermined level, by the operation of the arcs, it may be replenished automatically. A closed float chamber 32 is connected to the reaction chamber by conduits 33, 34. If the liquid falls below a predetermined level then, by the operation of automatic mechanism, additional liquid is introduced. The float 35 which is linked to a switch 36, closes the energizing circuit 37, 38 of a motor 39a which is mechanically connected to a pump 40 supplying HF to the inlet 18. By the rotation of the pump 15 connected to a motor 39, circulation of the liquid between the reaction chamber and the tank 16 is provided. The switch 36 has been conventionally indicated to represent any suitable form of switch, such for example as a mercury switch of the form described in United States Letters Patent No. 2,101,092. A one-way valve 44 is provided to hold pressure in the tank 16 when required. The energizing circuit 37, 38 has not been shown in its entirety and the source of current has been omitted to avoid complicating the drawing.

The gaseous pressure in the reaction chamber also may be automatically controlled by a relay 41, one contact element of which is connected to a sylphon bellows 42. For example, if the pressure of the gas should rise above a predetermined limit, then the contacts of the relay 41 are opened, thereby energizing a circuit breaker 43 which open-circuits the power supply lines 20, 21.

In the apparatus shown in Fig. 2, one of the electrodes is rotated transversely with respect to its cooperating electrode and thereby is rendered capable of agitating the particles of carbon. This apparatus, like the apparatus of Fig. 1, comprises a container 45 provided with a suitable lining 46. At the base of this chamber is a stationary carbonaceous electrode 47, for example, an electrode of graphite, to which is connected an electric terminal 48 by a bolt 49. The arc chamber is closed by a cover 50 consisting of suitable insulating material such as polyethylene which is bonded with Portland cement. The cover is arranged to be fastened down upon the container wall by the threaded bolts 51 which engage with nuts 52. Passing through the cover is an insulating sleeve 53 which may consist of the same polyethylene composition. It is pressed upon a shoulder of the cover aperture by a ring 54, a suitable packing being provided as indicated. The external threads of the ring 54 engage with the internal threads of a ring 55 which is bolted to the cover 50. Within the sleeve 53 is held a metal sleeve 56 within which turns a shaft 57, the lower end of which carries a conical bearing member 58. The latter is urged into seating relation to another bearing member 59 by a spring 60 at the upper end of the shaft 57. This spring is held under compression between a shoulder 61 on the shaft and an insert 62 in the top of the sleeve 56. The lower end of the rotatable shaft 57 carries an offset electrode 63 which is held eccentrically by a pin 64 on a link plate 65. The electrode 63 is urged upwardly against the plate 65 by a spring 66 which is held under compression in a recess as shown between a shoulder 67 and a pressure plate 68 bearing on the electrode 64.

The electrode shaft 57 is arranged to be rotated by a gear 70 engaging with a driving member 71. Electric energy is supplied by a stationary brush contact 72 bearing against a rotating ring contact 73. The eccentrically mounted electrode 64 when rotated exerts a stirring effect on a mass 75 of carbon granules which are immersed in a charge 76 of HF, in the arc chamber. The gaseous product produced by arcing escapes from the reaction chamber through a flue 77. The rotatable electrode and attached parts are arranged to be lifted by engagement with a ring 78. Gaseous HF formed during the process is condensed on coils 79 and is returned to the reaction mass, thus controlling the temperature.

Obviously, other embodiments of the invention could have been depicted by means of drawings, but it is believed that the accompanying drawings together with the description in the specification amply describe the presently claimed invention.

It is desirable, in order to obtain maximum efficiency of gas production, to so operate the apparatus that the ordinary conducting current between the electrodes should be kept at a minimum, the arc current then being at a maximum. The arc current is evidenced on an oscillograph by a succession of high, narrow peaks in the current. When using ordinary alternating current, the absence of arcing component would be evidenced by the current through the apparatus having the usual smooth sine wave form. When arcing occurs, sharp peaks are superimposed on the sine wave which progressively becomes reduced relatively until at maximum arcing the sine wave becomes replaced by narrow, high peaks of current.

Apparently the evolution of gas at the points of arc formation forces the arcing contacts between the loose particles apart until the arcs are extinguished and the gases are suddenly cooled. When a rotating electrode is used the number of conducting paths in the liquid HF is increased, said conduction paths being directly proportional to the rate of movement of electrode 63. Hence, the arcing rate can be controlled by rotation rate.

The type of apparatus capable of forming transient arcs will hereafter be referred to as a "transient arc apparatus."

If the carbonaceous granules contain gases, as is true of coke, they should preferably be degassed by subjecting them to high temperature under reduced pressure prior to use. In this way contaminants in the final fluorocarbon products are reduced.

The exit arms of the reactors 22 and 77 should be connected in series with a base scrubber such as aqueous NaF (to absorb excess HF passing through) and a final receiver cooled to a sufficiently low temperature so as to liquefy the fluorocarbons, such as a liquid nitrogen-cooled receiver, in that order. In this manner acidic materials, as well as HF, are scrubbed from the fluorocarbons.

In order that those skilled in the art may better understand how the present invention may be practiced, the following example is given by way of illustration and not by way of limitation.

*Example 1*

Coke granules (20–40 mesh) which had been degassed at 300–400° C. under reduced pressure were placed in a transient arc apparatus lined with polyethylene and these granules were completely covered with anhydrous liquid HF. The outlet was connected in series with an aqueous sodium fluoride scrubber and a liquid-nitrogen-cooled receiver in that order. Copper electrodes were immersed in the system and an arc-supporting current of about 1 ampere at 110 volts was applied causing a plurality of arcs to scintillate throughout the granules. The rate of current was controlled so that the general temperature of the reaction mixture did not exceed the boiling point of HF (19° C.). The products collected in the liquid nitrogen-cooled collector were analyzed in a mass spectrometer and among the fluorocarbons present were $CF_4$, $CF_2H_2$, $CF_3H$, $CFH_3$, $C_2F_5H$, etc. Other compounds observed were CO, $CO_2$, $H_2S$, and $C_2H_2$.

The products of this invention can be used as refrigeration and electric insulating gases, propellants for aerosols, etc. In addition the products which are not totally fluorinated can be chlorinated and pyrolyzed to tetrafluoroethylene, the starting material for perfluoroethylene polymers, as described in Schildknecht, Vinyl and Related Polymers (Wiley, 1952), pages 483–487.

What we claim as new and desire to secure by Letters Patent of the United States is:

1. A method of preparing fluorocarbons which comprises immersing carbon particles in substantially anhydrous liquid hydrogen fluoride, conducting an arc supporting current through the immersed carbon particles thereby forming a plurality of transient electric arcs which cause reaction between carbon and hydrogen fluoride and thereby producing fluorocarbons.

2. The process according to claim 1 in which the carbon particles are agitated during the process.

3. The process acording to claim 1 in which the carbon particles comprise coke.

4. The process according to claim 1 in which the overall temperature of the reaction is not higher than the boiling point of liquid hydrogen fluoride.

References Cited in the file of this patent
UNITED STATES PATENTS

| | | |
|---|---|---|
| 2,353,770 | Suits | July 18, 1944 |
| 2,709,183 | Farlow et al. | May 24, 1955 |